United States Patent
Maier

[11] Patent Number: 6,116,683
[45] Date of Patent: Sep. 12, 2000

[54] BICYCLE TOURING SEAT

[76] Inventor: Dillon Maier, R.D. 2 Box 2005, Oneonta, N.Y. 13820

[21] Appl. No.: 08/858,351

[22] Filed: May 19, 1997

[51] Int. Cl.[7] .................................................. B62J 1/06
[52] U.S. Cl. ........................................ 297/195.1; 297/201
[58] Field of Search ................................. 297/195.1, 202, 297/201

[56] References Cited

U.S. PATENT DOCUMENTS

| | | | |
|---|---|---|---|
| 572,062 | 11/1896 | Peck | 297/201 |
| 603,734 | 5/1898 | Peck et al. | 297/201 |
| 604,347 | 5/1898 | Bray | 297/201 |
| 606,818 | 7/1898 | Best | 297/201 |
| 656,854 | 8/1900 | Nord | 297/201 |
| 694,875 | 3/1902 | Meighan | 297/201 |
| 4,089,559 | 5/1978 | Prange | 297/201 |
| 4,387,925 | 6/1983 | Barker et al. | 297/201 |
| 4,512,608 | 4/1985 | Erani | 297/201 |
| 4,541,668 | 9/1985 | Rouw | 297/201 |
| 5,286,082 | 2/1994 | Hanson | 297/195.1 X |
| 5,387,025 | 2/1995 | Denisar | 297/201 X |
| 5,489,139 | 2/1996 | McFarland | 297/195.1 |

FOREIGN PATENT DOCUMENTS

| | | | |
|---|---|---|---|
| 1041106 | 10/1953 | France | 297/195.1 |
| 93432 | 11/1896 | Germany | 297/201 |
| 221494 | 8/1942 | Switzerland | 297/195.1 |

*Primary Examiner*—Peter M. Cuomo
*Assistant Examiner*—Rodney B. White
*Attorney, Agent, or Firm*—Thomas A. O'Rourke; Wyatt Gerber Meller & O'Rourke

[57] ABSTRACT

An improved bicycle seat is disclosed. The seat comprises a top surface and a bottom surface with the surfaces being connected by means of a front wall and a back wall and a pair of side walls. The seat has a vertical axis and a horizontal axis through the center of the seat. The seat pivots rotationally upwardly and downwardly through an arc in a vertical plane about the horizontal axis and pivots rotationally in a forward and rearward manner through an arc in a horizontal plane about said vertical axis when a bicycle is being pedaled.

6 Claims, 10 Drawing Sheets

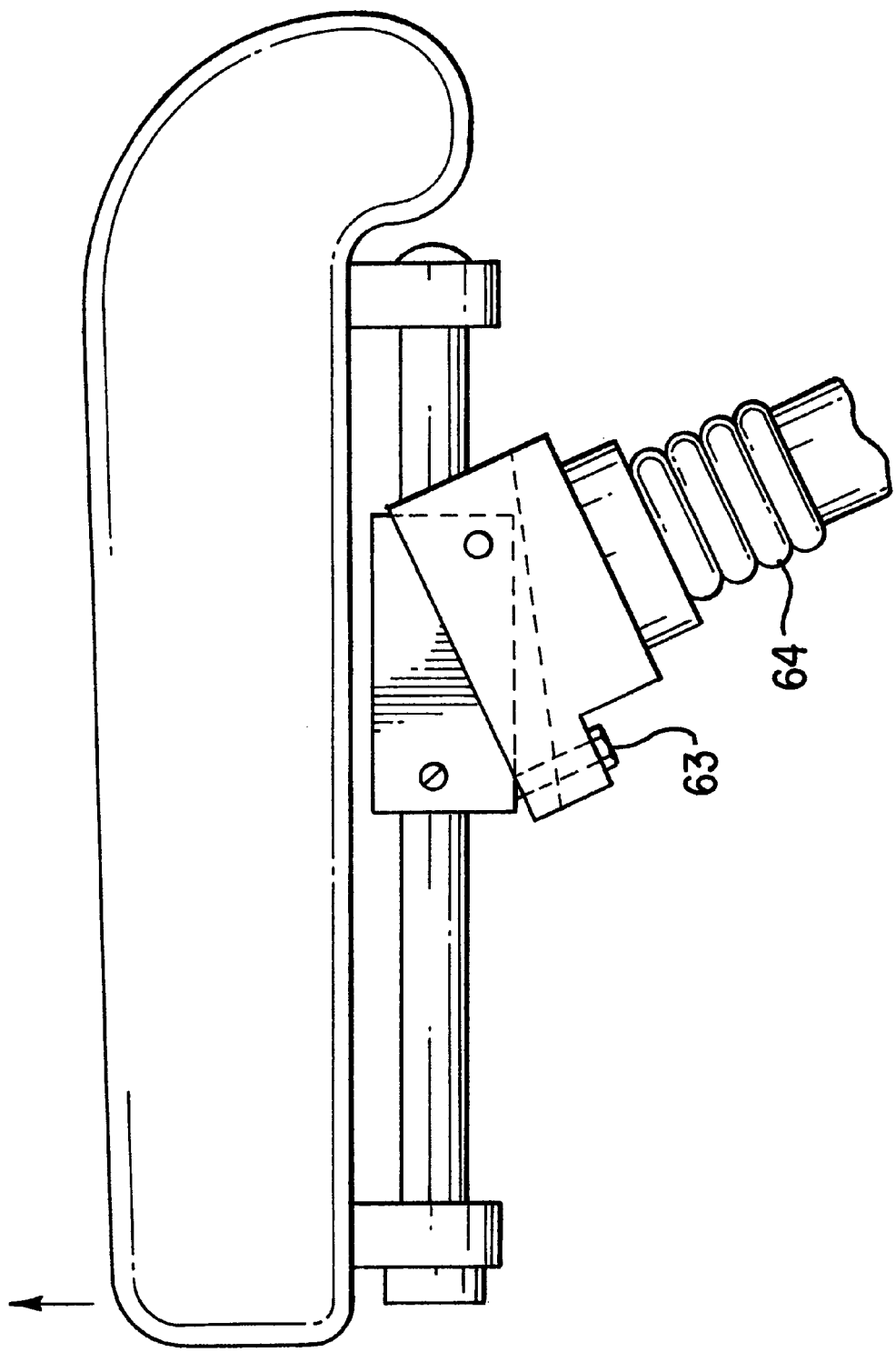

BICYCLE TOURING SEAT

The present invention is directed to an improved seat for bicycle touring and racing. As even a casual bike rider will recognize, the seats currently available on bicycles are not directed to comfort but are primarily utilitarian in design. In addition, current bicycle seat design do not aid the serious rider by reducing fatigue or providing more power to the downward strokes of pedalling.

Traditionally, there have generally been a few different classes of bicycles adapted for the various types of users. One class is the racing type bicycle. Typically, these have been multi-speed bicycles made of lightweight materials. The tires tend to be thin and the gear ratios set for speed. The seat design on these bicycles has been characterized by a minimalist approach and are primarily a narrow wedge. The seat on racing bicycles is generally thin in width at the front and gradually widens slightly toward the rear. Seats on racing bicycles provide only basic support for the rider without attempting to give any real comfort for long rides.

Bicycles that have come to be called mountain bikes have a generally sturdier construction with wider tires and a more aggressive tread than racing type bikes. Mountain bikes are not necessarily built for speed but are intended to be more rugged in view of the types of terrain these bicycles are intended for. Because weight and speed are not of the same concern in mountain bikes as they are in racing bikes mountain bicycles have seats that are typically broader than seats on racing bicycles. Some of these seats will have springs to provide additional support and cushion the ride. These broader seats provide a modicum of additional comfort but do not participate in the pedalling process in any fashion. In smaller sized bicycles, another type of seat that is frequently seen is the banana seat which is considerably longer than the traditional seats and not as triangular in shape as the seats on other bicycles. The extra length of the banana seats may permit an additional rider on the bicycle. However, since these seats are intended to give the bicycle a stylized look, the banana seats are often not likely to be found on larger bicycles.

Although bicycles been popular for over one hundred year there is still a need for a light weight seat that may be used on all types of bicycles but which provides not only significant comfort to the rider over a variety of terrains and for longer rides but also participates in the pedalling motion of the bicycle rider.

OBJECT OF THE INVENTION

It is an object of the invention to provide a light weight yet strong seat that may be used on all types of bicycles.

It is an object of the invention to provide a seat that is comfortable for the rider and which reduces fatigue over long distances and a variety of terrains.

It is a further object of the invention to provide a bicycle seat that is movable during pedalling to provide support for the body and to assist in increasing the force applied to the pedals.

SUMMARY OF THE INVENTION

The improved bicycle seat of the present invention has what can be characterized as a butterfly configuration when viewed from the front of the bicycle as it looks generally as a butterfly on the wing. In particular there is a center axis which has a raised ridge that rises toward the front of the seat and which tapers downwardly as the center axis approaches the rear of the seat. The center axis is generally parallel to and preferably in the same generally vertical plane as the rest of the bicycle. Extending outwardly from the center axis on each side thereof and transverse to the axis are a pair of wings or supports on which the rider's buttocks rest. These supports are generally concave in the center and have a raised rim around the concave center that provides additional support to the rider.

One important aspect of the improved bicycle seat of the present invention is the design of the mechanism for joining the seat to the frame of the bicycle. In particular, the seat has on its under surface a vertical center rod which extends downwardly and passes through the orifice in the top of the frame that is intended to receive the seat. Connected to the stem is a base and a second rod or stem which extends vertically from the base to a base member. The rod permits the seat to pivot about the rod in a horizontal plane. The base member has a second rod passing horizontally through the base member. The second rod permits the seat to pivot upwardly and downwardly about the center axis of the seat. Because of the pivoting action of the seat of the present invention the weight of the rider remains constant on the seat throughout all the cycling motions. Having the rider's weight remain constant on the seat during cycling is accomplished by having the seat flex up and down as the rider pedals. In addition, the seat pivots backwards as each leg pushes downward. Once the downward motion of the leg is completed the seat pivots back as the other leg begin its descent. This action prevents the rider's hamstring muscles from being compressed and aids in the riders comfort and ability to ride for long distances without discomfort. The back, rear of the seat can be angled to a raised or lowered position to increase the rider's comfort. The seat is also adjustable forwardly or rearwardly to adjust the distance of the rider from the handle bars.

BRIEF DESCRIPTION OF THE DRAWING

FIG. 13 is a side view of the seat of FIG. 10 showing the presence of a adjustable means for raising or lowering the tilt of the seat.

DETAILED DESCRIPTION OF THE DRAWINGS

Figure 1:
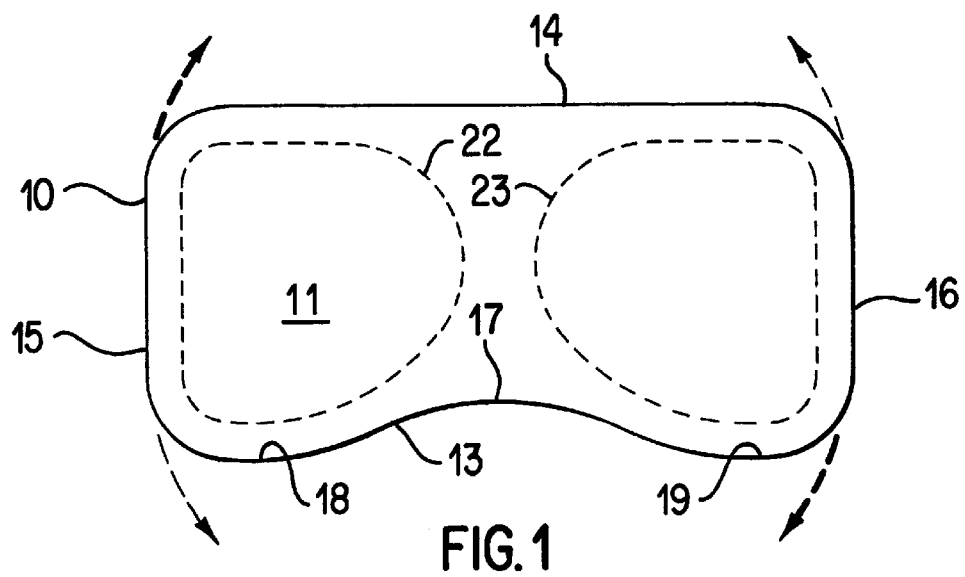
FIG. 1 is a top view of the bicycle seat of the present invention.

The bicycle seat 10 of the present invention has a top surface or seating area 11 and a bottom surface 12. The seat 10 has a front edge or wall 13 and a back edge or wall 14 with a pair of side edges or walls 15 and 16. The distance from the front wall 13 to the back wall 14 is generally shorter in the area of the center region 17 than the distance in the area of the two end portions 18 and 19 as the front wall has an inward curve toward that region from the two sides. The rear wall is generally straighter than the front wall although it need not be. As shown by the dotted arrows, the seat of the present invention pivots a short distance of approximately 1–5 inches in a horizontal plane in an arc about stem 20 as the rider is pedalling. Specifically when the rider is pedalling and the left foot is in the downward portion of the cycle, the end portion 19 pivots rearwardly and end portion 18 pivots forwardly. This motion of the seat is reversed when the left leg is at its lowest point in the pedalling process and the right leg begins its downward descent. As the right leg descends the end portion 18 pivots rearwardly and end portion 19 pivots forwardly. Thus the rider may remain in contact with the seat through the complete pedalling cycle.

Figure 2:
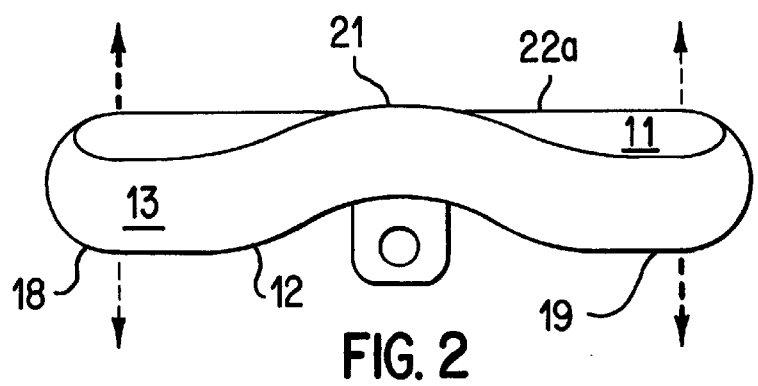
FIG. 2 is a front view of the seat of FIG. 1.

As shown in FIG. 2, the front edge 13 of the seat, in addition to being curved inwardly in the center region when viewed from the top, has a raised portion 21 towards the center region while the end portions 18 and 19 are generally lower giving the seat what could be called a butterfly look when viewed from the front of the seat. The top surface of raised portion 21 is generally in the same horizontal plane as the top surface 22'aof back wall 14. The area within the dotted lines 22 and 23 is the generally concave upper surface of the seat which provides a more contoured surface for the rider to sit on. The design of the seat provides the rider with a more comfortable ride than has been obtained from prior art seats.

The dotted arrows in FIG. 2 demonstrate the upward and downward motion of the seat during pedalling. As the left foot travels downward, the left side of the seat 19 pivots downwardly and the right side of the seat 18 travels upwardly. Similarly, when the right leg begins its downward travel the right side of the seat 18 travels downwardly and the left side 19 pivots upwardly.

Figure 3:
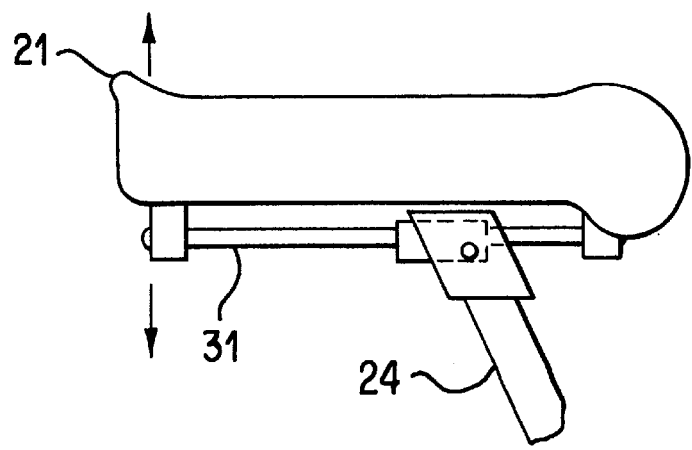
FIG. 3 is a side view of the side of FIG. 1.
Figure 4:
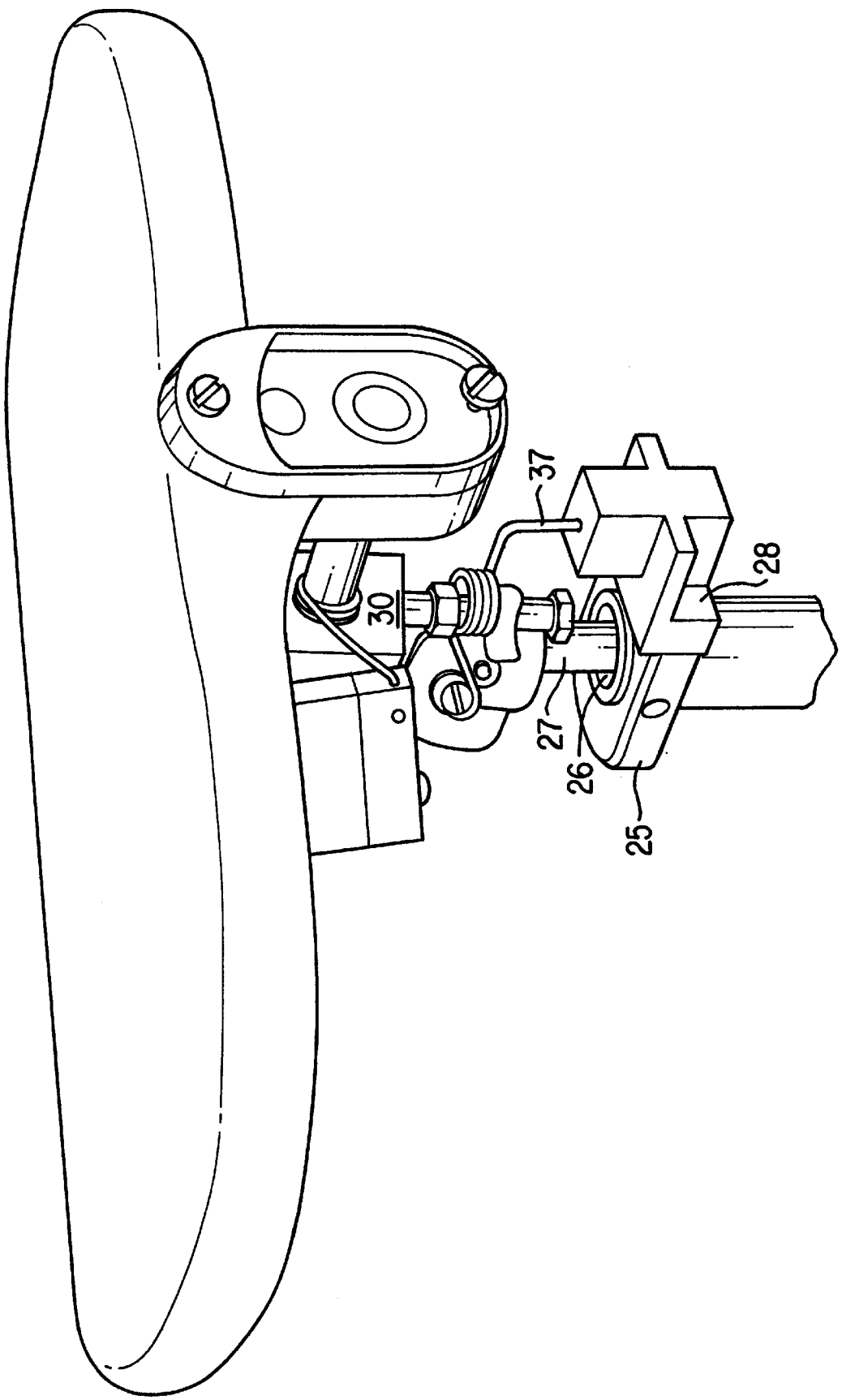
FIG. 4 is a front perspective view of the of the seat of FIG. 1.
Figure 5:
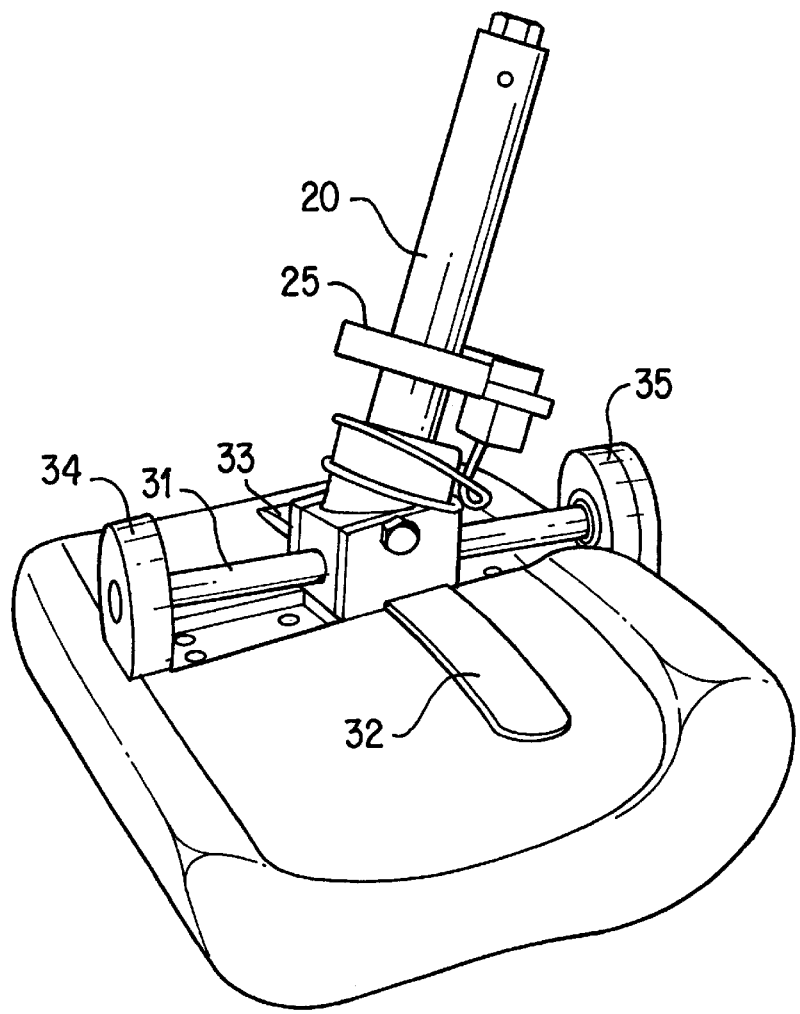
FIG. 5 is a prospective view of the underside of the seat of FIG. 1 from the right side of the seat with the seat configured to tilt forward.
Figure 8:
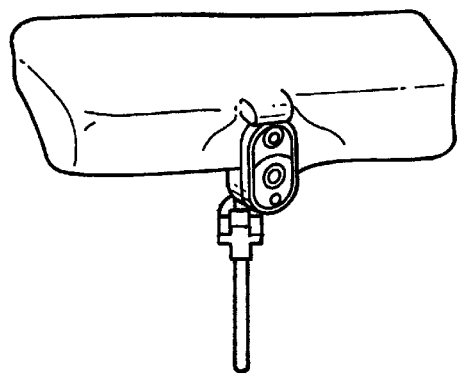
FIG. 8 is a front perspective view of the seat of FIG. 1 with a cover over the seat.
Figure 6:
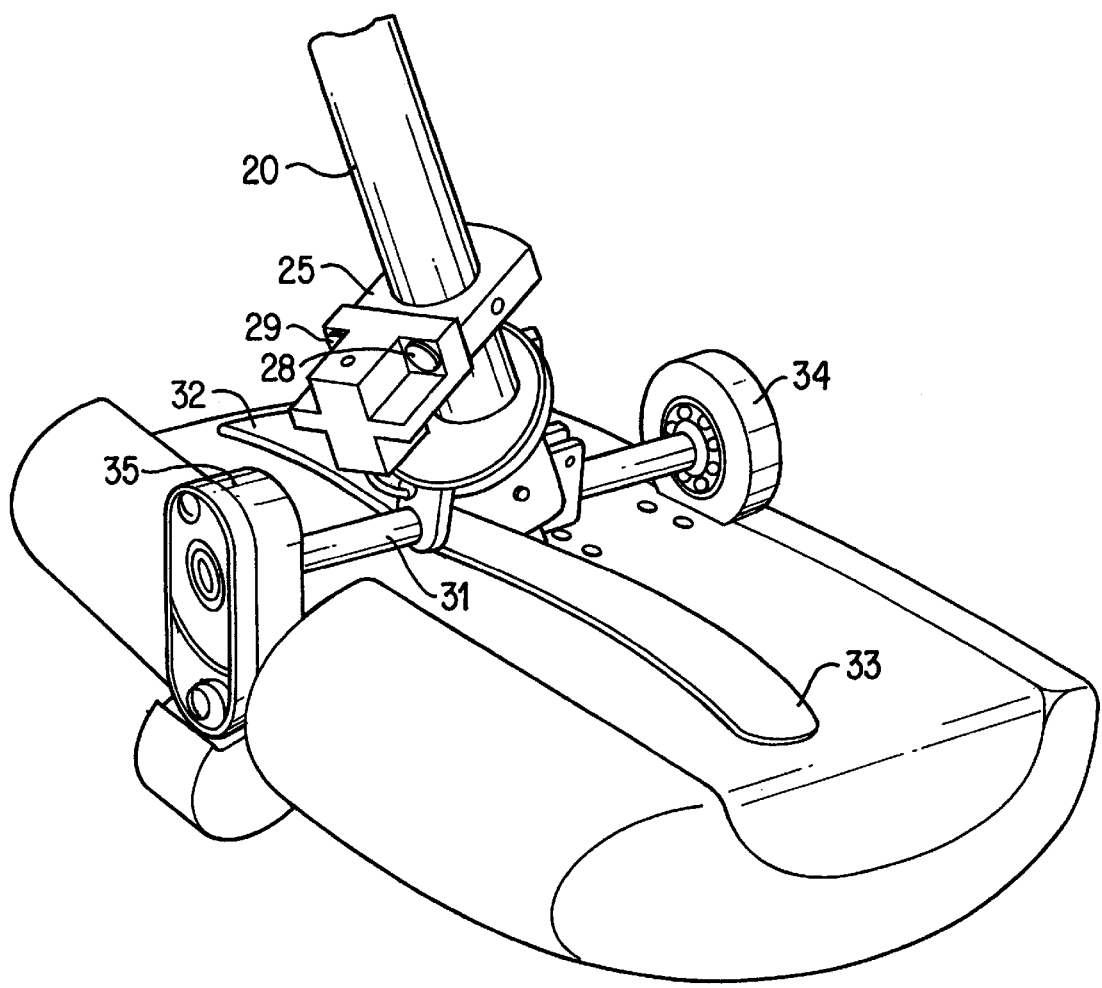
FIG. 6 is a prospective view of the underside of the seat of FIG. 1 from the left side of the seat with the seat configured to tilt forward.
Figure 7:
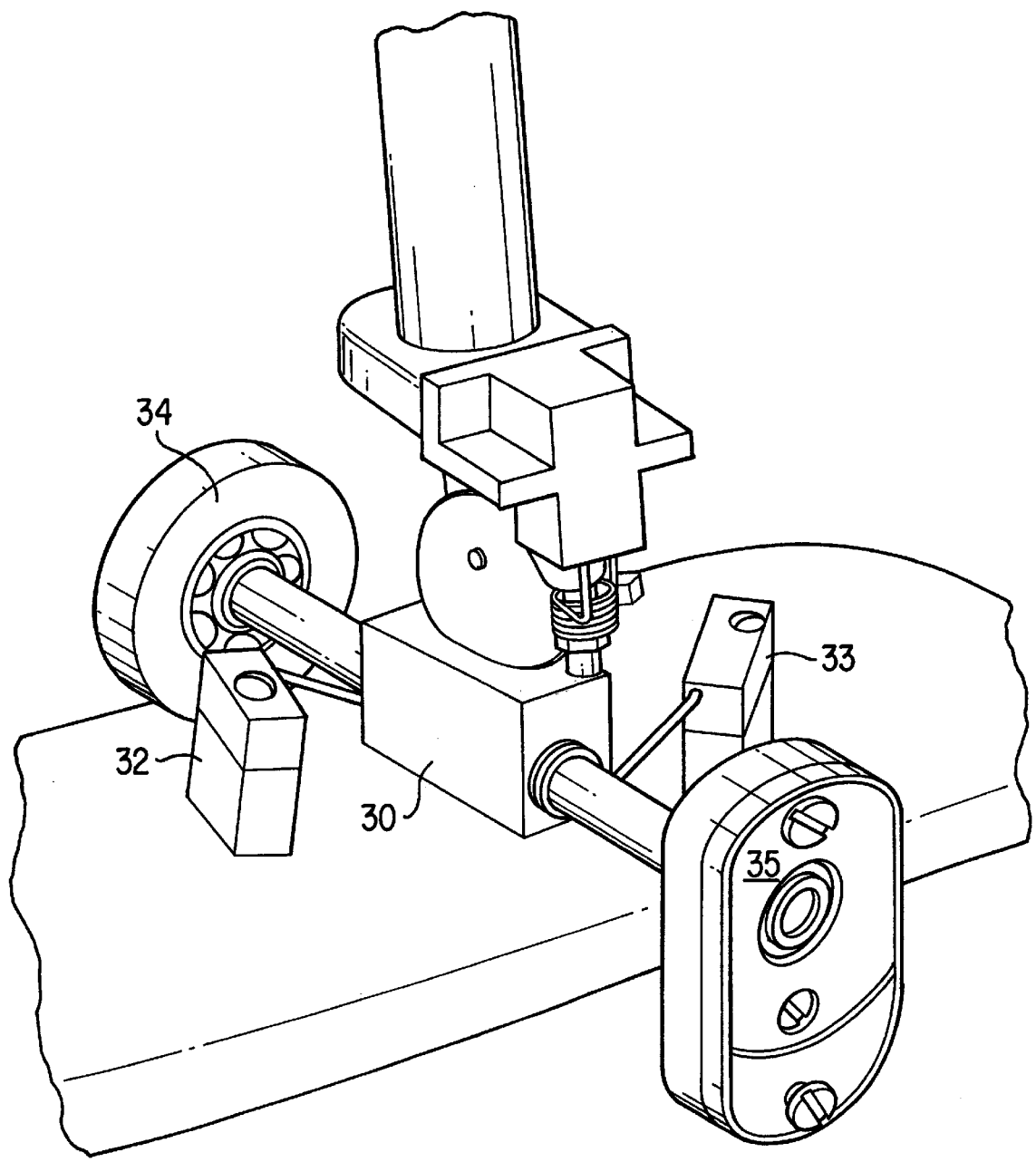
FIG. 7 is a perspective view of the underside of the seat of FIG. 1 with the seat in a generally level position.
Figure 9:
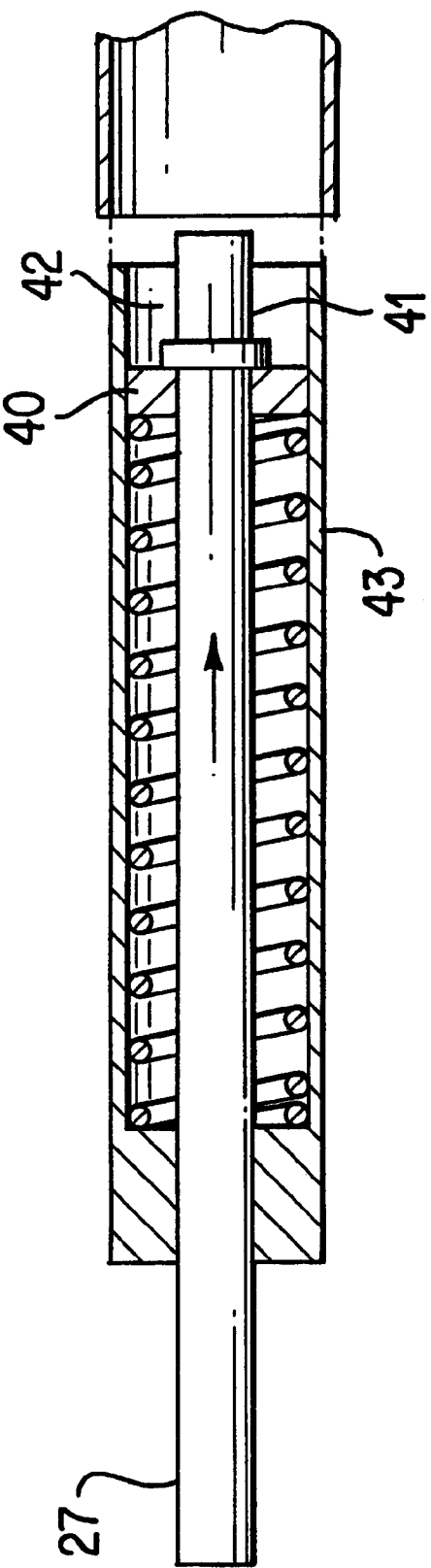
FIG. 9 is a cutaway view of the seat stem of the seat mechanism of the present invention.

In addition to the unique seat design of the present invention, the mechanism for attaching the seat to the frame is an important feature as its design permits the two types of pivoting motion of the seat during cycling. As shown in FIG. 3 the mechanism is on the underside of the seat. Stem 20 is adapted to be inserted into the orifice for the seat on the bicycle frame (not shown). Attached to the stem by any suitable means, such as set screws, is a base 25. Base 25 may be comprised of any suitable material such as hard plastic metal such as aluminum. The upper surface of the base has an orifice 26 into which a second stem or rod 27 is inserted. Base 25 has a pair of locking screws 28 and 29 which lock rod 27 to the base and prevent excess rotational movement of the rod 27 on the stem. On rod 27 is pivotably mounted a base member or barrel 30 which permits the seat to be pivoted forward or backward about rod 27. This movement is rotational about an arc. Spring 37 is connected to the base 25 and permits rotational movement of the seat in an arc of a few degrees. The second rod or stem 27 provides cushioning for the rider because as shown in FIG. 9 the rod is spring loaded into stem 20. Rod 27 has a flange or stopping means 40 at end 41 that prevents rod 27 from being removed from shaft 42. Compression spring 43 provides cushioning to the seat. Shaft 42 can connect base 25 to the stem 24. Passing through base member 30 is a transverse rod 31 which is generally perpendicular to stem and parallel to the direction of travel of the bicycle. Extending from base member 30 and transverse to the rod 31 is a pair of springs 32 and 33. The spring means 32 and 33 are on opposite sides of base member 30. The springs provide additional cushioning and, in conjunction with the rod 31 permit the seat to pivot upwardly or downwardly as the rider is pedalling as discussed above. Thus, the rider is in contact with the seat throughout the pedalling motion which prevents muscle fatigue. Rod 31 is held in place at each end by means of a pair of lateral brackets 34 and 35 that permit the seat to pivot about the rod 31 yet prevent forward or backward motion of the rod and also as a result, the seat.

The lateral bracket is lockable to prevent the seat from rotating about rod 31 an undue amount. The locking also sets the seat distance from the handle bars.

Figure 10:
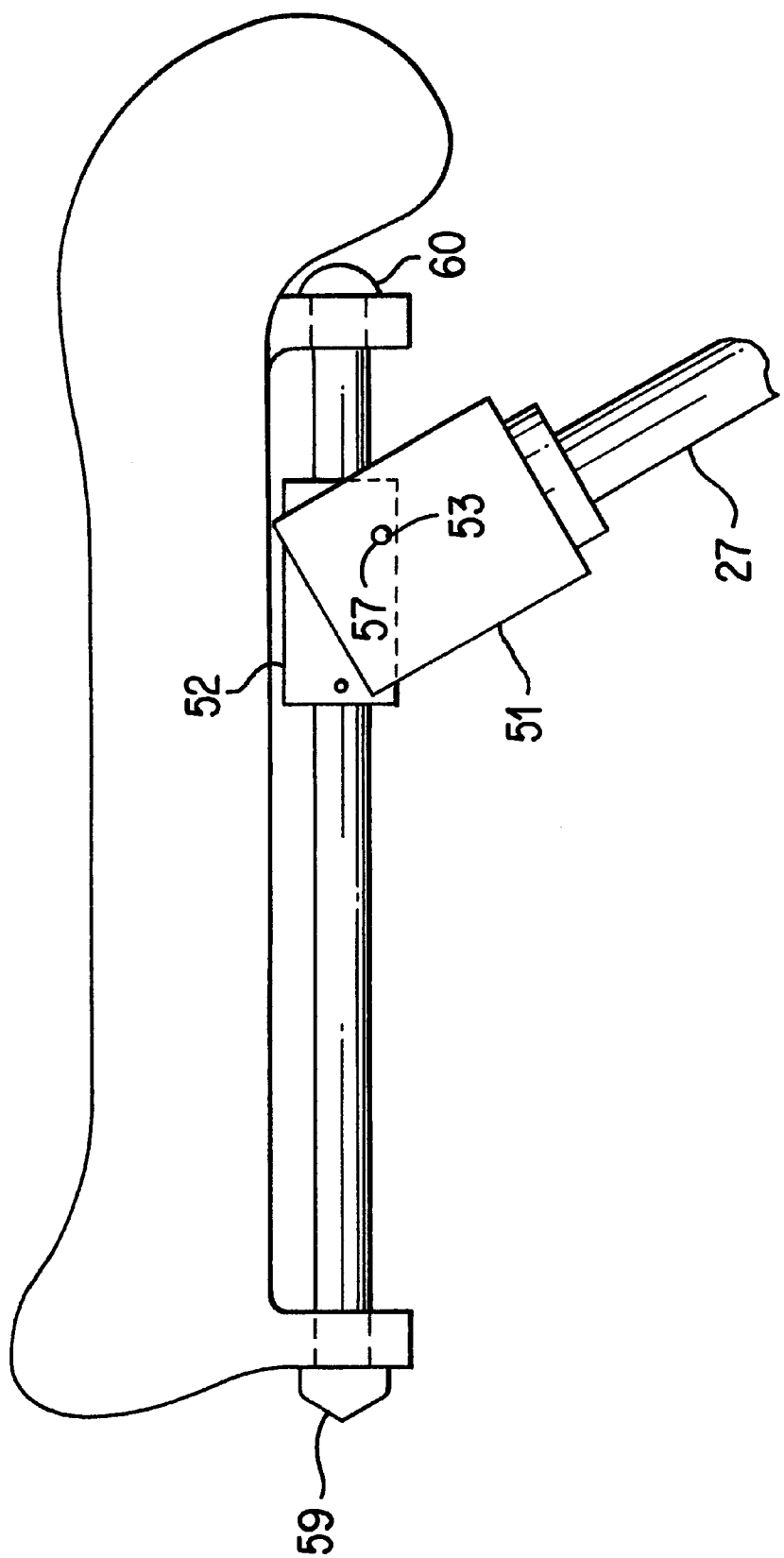
FIG. 10 is an alternate embodiment of the structures shown in FIG. 3.
Figure 11:
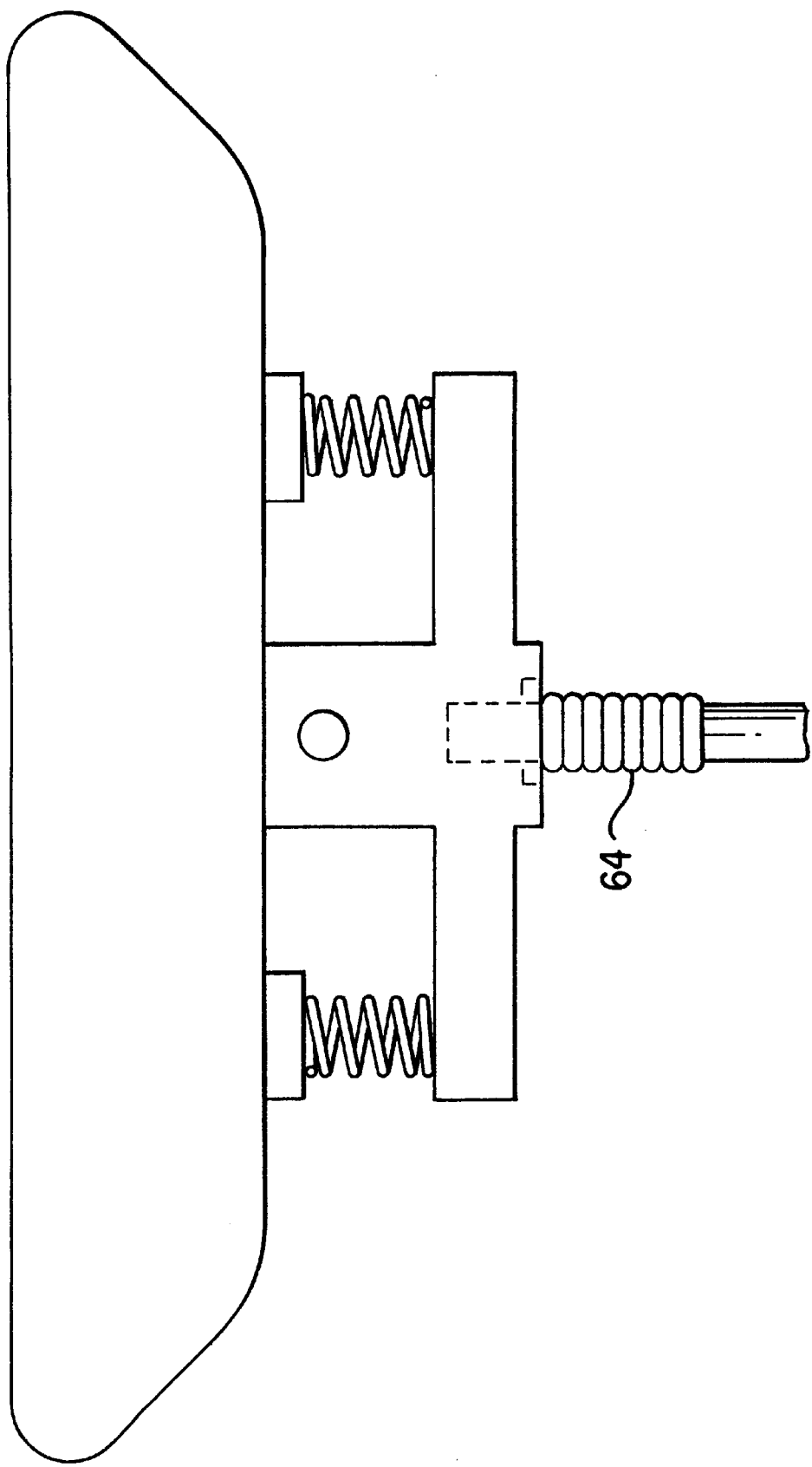
FIG. 11 is an alternate embodiment of the seat mechanism of the present invention.
Figure 12:
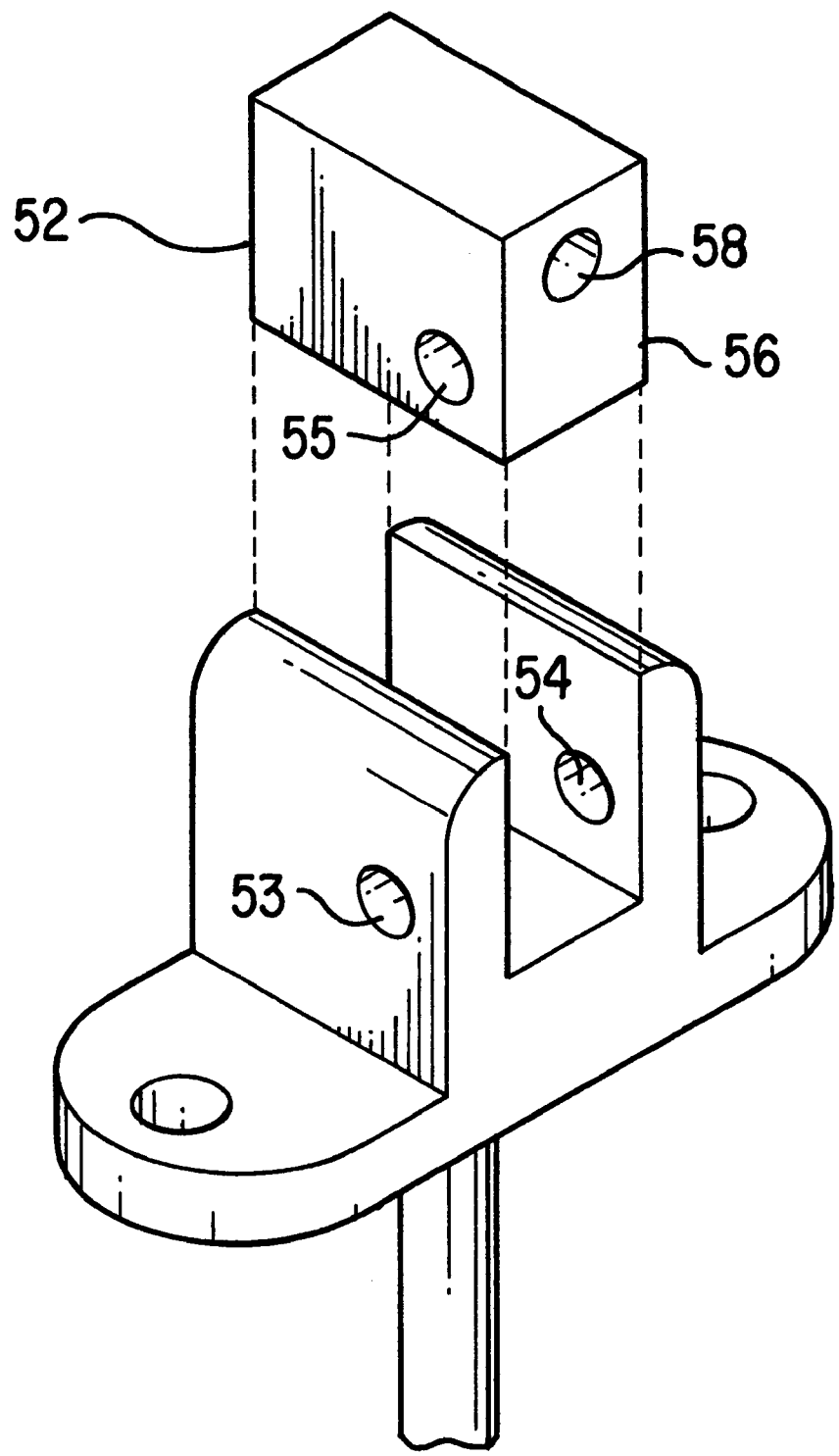
FIG. 12 is an exploded view of the barrel block of the seat mechanism.

FIG. 10 shows an alternate embodiment of the seat mechanism of the present invention. In this embodiment the barrel 51 is connected to the rod 27. This barrel has rocker barrel block 52 that is rotatably mounted in the barrel block. The size of the rocker barrel block only permits rotational movement over a small arc. Barrel 51 has a pair of pivot holes 53 and 54 that mate with holes 55 and 56 in the rocker barrel block 52. A shaft 57 retains the barrel and barrel block. As shown in FIG. 13 there is a adjustment means 63 for tilting the seat. In FIG. 13 the adjustment means is in the form of a screw which raises the barrel block 52 in the barrel block 51. However, other suitable means may be used. A vinyl covering 64 is on the stem under the barrel block 51.

The barrel block 52 has an orifice 58 for rod 31. Rod 31 may have a flange or retaining means 59 and 60 at either end to retain the shaft in position.

In some instances the rider does not wish to have the seat level, the base member 30 permits the seat to be tilted forward or backward as the rider desires. In addition the lockable members 34 and 35 permit the seat to be moved closer to or further away from the handle bars as necessary.

The seat is made up of a rigid base material such as metal or plastic. Where weight is a consideration any number of holes may be present in the material to reduce the weight without sacrificing strength. Over the base may be placed a suitable cushioning material. A water resistant or water repellant cover may go over the cushion.

I claim:

1. An improved bicycle seat comprising in a unitary, one-piece structure, a single substantially planar top surface and a bottom surface, said top surface and bottom surface being connected by means of a front wall and a back wall and a pair of side walls and wherein said seat has a vertical axis and a horizontal axis through the center of said seat whereby said seat pivots rotationally upwardly and downwardly through an arc in a vertical plane about said horizontal axis and pivots rotationally forwardly and rearwardly through an arc in a horizontal plane about said vertical axis when a bicycle is being pedalled.

2. The bicycle seat accordingly to claim 1 wherein the top surface of the seat has a pair concave areas.

3. The seat according to claim 1 wherein said seat has a bracket on the bottom surface of the seat near said front wall of the seat and a bracket on the bottom surface of the seat near said rear wall of the seat and a rod passing through said brackets, said rod having thereon a rocker barrel block rotatably mounted on a shaft.

4. The seat according to claim 3 wherein said rocker barrel block is rotatably mounted on a barrel.

5. The seat according to claim 3 wherein said barrel has a spring means extending outwardly therefrom providing cushioning for said seat.

6. The seat according to claim 3 wherein said shaft is provided with a compression spring and a rod passing through said compression spring, said rod having a stopping means at an end of said rod such that said stopping means prevents said rod from being removed from said shaft and retaining said compression spring in position in said shaft.

* * * * *